US008560373B2

(12) United States Patent
Fraser

(10) Patent No.: US 8,560,373 B2
(45) Date of Patent: *Oct. 15, 2013

(54) DIRECT MARKETING SYSTEM FOR MATCHING CALLER VALUE TO RISK AND REVENUE

(76) Inventor: Eileen A. Fraser, Santa Monica, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/238,264

(22) Filed: Sep. 25, 2008

(65) Prior Publication Data

US 2009/0024453 A1    Jan. 22, 2009

Related U.S. Application Data

(63) Continuation-in-part of application No. 10/860,231, filed on Jun. 3, 2004, now Pat. No. 8,234,169.

(60) Provisional application No. 60/975,459, filed on Sep. 26, 2007.

(51) Int. Cl.
*G06Q 10/00* (2012.01)

(52) U.S. Cl.
USPC ............. 705/7.29; 705/26.43; 705/26.44; 348/143; 348/222.1; 348/169; 348/207.1; 379/114.03; 379/145; 379/88.03; 379/265.01; 715/749; 715/708; 715/771; 715/853; 704/246; 704/252; 704/231; 704/243

(58) Field of Classification Search
USPC ............................................. 705/7
See application file for complete search history.

(56) References Cited

U.S. PATENT DOCUMENTS

| | | | |
|---|---|---|---|
| 6,055,513 A | 4/2000 | Katz et al. | |
| 6,424,949 B1 | 7/2002 | Deaton et al. | |
| 6,597,685 B2 | 7/2003 | Miloslavsky et al. | |
| 7,023,979 B1* | 4/2006 | Wu et al. | 379/265.11 |
| 2002/0055906 A1 | 5/2002 | Katz et al. | |
| 2002/0059283 A1* | 5/2002 | Shapiro et al. | 707/100 |

OTHER PUBLICATIONS

Shearer, Colin. In the Face of Do-Not-Call. Creating Profit in the Call Center. Customer Inter@action Solutions. Mar. 2004.*

* cited by examiner

*Primary Examiner* — Ryan Zeender
*Assistant Examiner* — Fawaad Haider
(74) *Attorney, Agent, or Firm* — Sanford Astor; Brooks Kushman P.C.

(57) ABSTRACT

A method for direct marketing comprising establishing a first communications link between a prospective customer using a device having a unique identification number and a communications device, automatically transmitting the unique identification number associated with the prospective customer's device to the communications device, establishing a second communications link between the communications device and a computer operably connected to a memory apparatus having a prospective customer database comprising prospective customer information associated with the unique identification number of the prospective customer's device, in which the information in the database determines prospective customer value which can be used to determine subsequent operations and marketing actions with the prospective customer.

3 Claims, 10 Drawing Sheets

Example of how Prospective Customer Value impacts Hold Time, Products Offered, Packaging and Shipping Example of how Advertiser's Chargeback Cap + Value impacts Hold Time, Product Offers, Packaging and Shipping

Figure 7.1

Customer Identification
    Address
    Zip code
    County
    ADI (area of dominant influence)
    ANI(s) number
    Delivery method/type
    VoIP(s) number
    Electronic Numbering (ENUM)
    Common Short Codes (CSC)
    Subscriber Number
    Customer Number

Response type
    Phone(s)
        Inbound
        Outbound
        Customer Service
    Internet
        Search Engine
        e-mail marketing
        Affiliate
        e-mail
    Mobile
        Short Message Service (SMS)
        Premium SMS
        Multimedia Messaging Service (MMS)
        Short Code

Life Events
    Just moved
    New baby
    New job
    Marriage
    Divorce
    Retirement

Demographics
    Age
    Gender
    Household Income
    Type and Length of residency
    Marital status
    Ethnicity
    Presence of Children
    Employment/Occupation

Psychographics
    Lifestyle, Privacy, Events etc.

Media Channel & Marketing Source
    Electronic Media
        TV
            Infomercial
            Station
            DayPart/Prime time
            Home shopping
            Entertainment
            Movies
            Satalite TV
            Cable TV
            Streaming Video Radio
        Station
        Time slot
    e-commerce
        Wireless Application Protocol (WAP)
        PC-oriented web
        SMS, EMS, Wap Push Print by class, title and name
        Newspaper
        Free Standing Insert (FSI)
        Magazine
        Catalog
        Picture
        Direct Mail
        Package Insert
        Bounceback
        Co-op
        Cards, including Warranty
        Statement Stuffers
        Coupon
        Gift Certificate Retail
        Department
        Apparel
        Specialty
        Store location 800 # vs. paid call
        by number MultiChannel
        Buyer
        Responder

Figure 7.2

Purchasing History
    Prior Purchases
        Lifetime Value
        Product Classifications
        Product Brands & Groups
            Loyalty
        Sku # or unique #, including
            Radio frequency ID tags
        Products by name and number
            Primary
            Upsell
            Downsell
        Quantity
        Size
    Price
        Monetary Value
        Individual transactions
        Lifetime transactions Recency
        Last Purchase
        Every Purchase
        Never Purchase Continuity
        Frequency
        Turns 3rd Party and Club experience
    Rush Shipping Customer Service
        Returns
        Cancels
        Chargebacks, unsatisfied
        Bad Debt
    Inventory availability

Non-purchase response
    Responded but did not purchase

Payment Methods
    Credit card by Brand
    Debit card by Brand
    Credit clearance
    Check and/or e-check
    Money Order
    Single pay
    Multi-pay
        # of payments

Offers/Script
    Offer Savings Value
    Advertised price
    Quantity
    Gift Certificate
    Free gifts
    Free shipping & handling
    Membership/Club
    $ Discounts
    % off
    Free Trial
    Paid Trial
    2 for 1
    Friend get Friend
    Continuity
    Agree to fixed number shipments
    Coupon
    Survey

Time and Frequency
    Time of day
    Day of week
    Date
    Seasonality
    Holiday
    Birthdate/Anniversary
    Duration of contact
    Dormancy
    Number of contacts
    Recency
    Frequency

Figure 7.3

Telemarketing Agent
- Prior Success with Advertiser
- Prior Success with this type of product and/or service
- Prior Success with pricepoint
- Prior Success with primary offer type
- Prior Success with upsell offer type
- Prior Success with 3rd party offer type
- Agent contribution to media expense
- Prior Success with any other data point mentioned in Figures 7.1, 7.2 or 7.4
- Average Order Value
- Order Conversion Rates

Additional Media
- Planned Media Airing
- Unplanned Media Airing
- Media Minute
- Media Source
- Media History
- Media ROI
- Media ROI goal
- Media Cost
- Media Purchaser
- Media Cost Per Call
- Media Cost Per Order
- Average Order Value

Advertiser
- Advertiser ROI
- Advertiser ROI goal
- Advertiser Chargeback Risk
- Advertiser Return Risk
- Advertiser Cancel Risk
- Revenue per Media Dollar Spent

History of Chargebacks
- Product Category
- Price Point
- Offer Type
- Recency
- Frequency
- Order Value
- Credit Issuer or Credit Type

History of Cancels
- Product Category
- Price Point
- Offer Type
- Recency
- Frequency
- Order Value
- Credit Issuer or Credit Type

Telemarketer
- Telemarketer ROI
- Telemarketer ROI goal
- Telemarketer Abuse Caller Risk
- Telemarketer Compensation
- Telemarketer Expense
- TSR Expense
- TSR Bonus Expense

Additional Inventory
- Source
- Location
- Cost of Goods Sold

Fulfillment
- Source
- Location
- Ship Method
- Package Inserts
- Packaging

Additional Time and Frequency
- Call Blocking
- Hold Time (wait time)
- Calls in Queue

Call Center Performance Metrics
- Calls Received
- Order Conversion
- Revenue per Call Offered
- Average Order Value
- Talk Time and Call Length

Overall Metrics
- Media Expense per Call
- Telemarketing Expense per Call
- Media Expense per Order
- Telemarketing Expense per Order
- Revenue Earned per Media Dollar Spent
- ROI Goal

History of Returns
- Product Category
- Price Point
- Offer Type
- Recency
- Frequency
- Order Value
- Credit Issuer or Credit Type

History of Bad Debt
- Product Category
- Price Point
- Offer Type
- Recency
- Frequency
- Order Value
- Credit Issuer or Credit Type

Figure 7.4
Examples of what the Telemarketing Sales Rep (TSR) Sees About Caller

*TSR May See with Invention*
*All Fields Optional*

ANI                                                                DNIS

Prospect Value Indicator
    High - Medium - Low indicator
    Or, Prospect Value Score Prospect Risk Indicator
    Chargeback Risk
    Return Risk
    Cancel Risk
    Bad Debt Risk Media Expense Indicator
    Media cost per minute
    Media cost per call
    Media cost per order TSR Success Rate
    by Prospect Value
    by Media Expense
    by Advertiser
    by Category of Product and/or Service
    by Primary Order Conversion Rate
    by Upsell(s) Conversion Rate
    by Average Order Value (AOV)
    ROI
    Time of Day
    Day of Week TSR Success Rate compared to Other TSRs
    by Prospect Value
    by Media Expense
    by Advertiser
    by Category of Product and/or Service
    by Primary Order Conversion Rate
    by Upsell(s) Conversion Rate
    by Average Order Value (AOV)
    ROI Telemarketing Script or No Telemarketing Script TSR Incentives
    Bonus Revenue Opportunities Customer Service
    History of Purchases
    History of Payments
    Customer Service Details

DIRECT MARKETING SYSTEM FOR MATCHING CALLER VALUE TO RISK AND REVENUE

This application claims the benefit of U.S. Provisional Application Ser. No. 60/975,459, filed Sep. 26, 2007, which application is incorporated herein by reference, in its entirety. This application is a continuation-in-part of my pending patent application Ser. No. 10/860,231, filed on Jun. 3, 2004.

FIELD OF THE INVENTION

The present invention relates to a system for providing acute marketing intelligence about prospective customer(s) which is dynamically triggered at the time when contact is initiated and any unique identification number of a prospective customer is transmitted. The unique identification number may be an Automatic Number Identification (ANI), VoIP extension numbers, and/or Electronic Numbering (ENUM), Common Short Codes (CSCs) or Subscriber Number or any other unique identification number of a communications device.

The present invention may be utilized in situations where a telephone call or data transmission or contact is received via traditional land line telephone, cordless phone (WiFi), mobile phone, Voice over Internet Protocol (VoIP) transmitting via the Internet or other packet-switched networks, Dual-tone Multi-Frequency (DTMF), Radio-Frequency Identification (RFID), fiber optic cable, or satellite transmission. The call itself may be a voice call or a text message such as Short Message Service (SMS) or Premium SMS, or Multimedia Messaging Service (MMS).

The present invention may be utilized in situations where the contact is initiated by a service provider, a seller or seller's representative or by the prospective customer. The present invention may be utilized in situations where a service provider, such as a telemarketing representative agent (TSR) is either a live agent or a recorded voice or computer generated voice or touchtone response and includes interactive voice response (IVR), automated speech recognition (ASR), dual-tone multi-frequency (DTMF), or data response such as SMS, EMS or Wap Push, picture response, financial transaction and/or other methods of response handling. The present invention may also be utilized in a web environment including Wireless Application Protocol WAP) and/or PC-oriented web and/or radio frequency (RFID) environment and/or cable environment.

The invention may be utilized in, but is not limited to, areas such as marketing of goods and services, coupons, political activities, find raising, public advocacy, loan applications, regulatory agency oversight, sweepstakes, movies, entertainment content and any other matter where a database of the prospective customer's activities including zero data points, one data point or more data points may be utilized in modeling score(s) of customer value to influence downstream actions such as to accelerate or stall call handling, and/or to influence selection of seller's representative live and/or IVR agent, and/or to provide the seller's representative information useful about seller representative's own performance and/or information about the prospective customer, and/or to influence product(s) offered, and/or to influence content delivered, including but not limited to, the primary advertised product and/or secondary "teased" and/or unadvertised offer(s), including $3^{rd}$ party offer(s) selection, and/or to influence scripts or non-scripts, and/or information useful in providing an offering to the prospective customer or interviewee.

The invention may also be used to reduce Advertiser risk from problematic customers, such as those likely to charge back purchases and/or return purchases and/or abusive callers, and/or those likely to cancel and/or stop making payments (bad debt). Prospective customer(s) with a projected propensity to charge back may have high dollar potential along with high risk potential (high$/highC), they may have low dollar potential with high risk potential (low$/highC), etc . . . .

The invention may also be used to reverse-engineer call center (or service provider) procedures to bring media revenue results into closer alignment with an Advertiser's Return on Investment (ROI) goal, per media dollar spent. The invention may also be used to improve a Telemarketer's (or service provider's) Return on Investment (ROI).

The invention may utilize the Automatic Number Identification (ANI) for the telephone utilized by the prospective customer and/or the Dialed Number Identification Service (DNIS) identifying the particular telephone number or "application" dialed by the prospective customer and/or linked to the prospective customer. As used herein, a prior customer may also be described as a prospective customer or prospective purchaser. While a telemarketing example is used, the same process can also apply to an online response, mobile response, fiber optics response, radio frequency identification (RFID) response or other response formats.

BACKGROUND OF THE INVENTION

At the present time, an advertiser directly selling goods and services with a publicized number, such as a toll free 800# or a toll number, customarily utilizes a telemarketing call center to receive the call and attempt to capture the sale. However, not every call or response is of equal value to the advertiser. Ideally, highest value prospective customers warrant the shortest wait time reaching a TSR, and the highest quality TSR available at that moment, and the optimum quantity of relevant upsell product or service offerings with the fewest unrelated upsell product or service offerings. In the worst case scenario, a potential sale may even be detrimental to an advertiser's business because the prospective customer may be one who is chronic in returning products and/or claiming a chargeback, and/or likely to cancel their order, and/or likely to stop making payments (bad debt).

SUMMARY OF THE INVENTION

Based on a further embodiment of my pending patent application Ser. No. 10/860,231, this chargeback example is used to demonstrate one use of the patent application Ser. No. 10/860,231 system to generate more revenue while reducing the risk of generating a new chargeback, which may increase transaction cost for the Advertiser and may compromise the Advertiser's standing with their Merchant Bank.

A chargeback is defined as a dispute of a prior purchase, whereby the purchaser instructs their credit card or debit card provider to dispute an item this customer purchased and/or the transaction price charged. A chargeback request triggers a chain of events back through the credit card financial cycle.

At the time of a transaction, the cardholder purchasing customer) has an existing line of credit with the Issuer (i.e. MasterCard or Visa) and provides their credit card or debit card number over the phone or electronically to an Advertiser's (also called Merchant's) telemarketing agent or service. The telemarketer transmits the order to the Advertiser's fulfillment processor. The fulfillment processor transmits the order to the Advertiser's Merchant Bank, an authorized acceptor of the card used. The Merchant Bank pays MasterCard or Visa a fee. The Merchant Bank sends the authorization request to the cardholder's Issuer and the Issuer approves or declines the transaction. The Issuer bills the cardholder and sends a response to the Merchant Bank. The Advertiser receives funds. Fees are paid all along the way.

When a cardholder (purchasing customer) rejects a transaction on their credit card or debit card statement, this is called a chargeback. A chargeback reverses this entire process through the Issuer, the Merchant Bank, the Advertiser's fulfillment processor and the Advertiser. A chargeback could be for a portion of the transaction or for 100% of the transaction. A chargeback is detrimental to the entire credit processing chain. Therefore, Merchant Banks limit chargebacks at the rate of approximately 1% per month of the sales volume for an Advertiser. Merchant Banks may also increase their processing fees as chargeback rates rise. Advertisers risk losing their ability to transact business in the event their chargeback rate exceeds limits imposed by their Merchant Bank. Thus, there is a need for Advertisers to manage their chargeback risk when selling to prospective customer(s) exhibiting a history of chargeback on prior transactions and/or projected to be a chargeback risk, involving either the current Advertiser and or other Advertisers. To address this major industry concern, a way is demonstrated to minimize future chargebacks on products and/or services sold today. The same process can also be used to minimize future product returns on products sold today. The same process can be used to minimize other negative purchaser behavior such as bad credit risk, cancellations, abusive callers etc. The present invention fulfills inter alia, the aforesaid needs and desires.

Also demonstrated is reverse engineering to drive call center decisions (or service center decisions) based on an Advertiser's Media ROI (Return on Investment) Goal achievement, or lack of achievement and/or Telemarketer's ROI (or service center's ROI). Also demonstrated is how Caller Value and Advertiser's ROI goals tie to hold time and selection of TSR and/or IVR as well as product offering(s) and script(s).

How the TSR and/or IVR can utilize modeling score(s) information of prospective customer(s) value is also illustrated.

DETAILED DESCRIPTION OF THE INVENTION

By using prior chargeback incidents and/or modeling propensity for chargeback actions, the present invention is able to filter chargeback prospective customer's current responses for special handling. By using prior return incidents and/or modeling propensity for return actions, the present invention is also able to filter return prospective customer's current responses for special handling.

Figure 1:
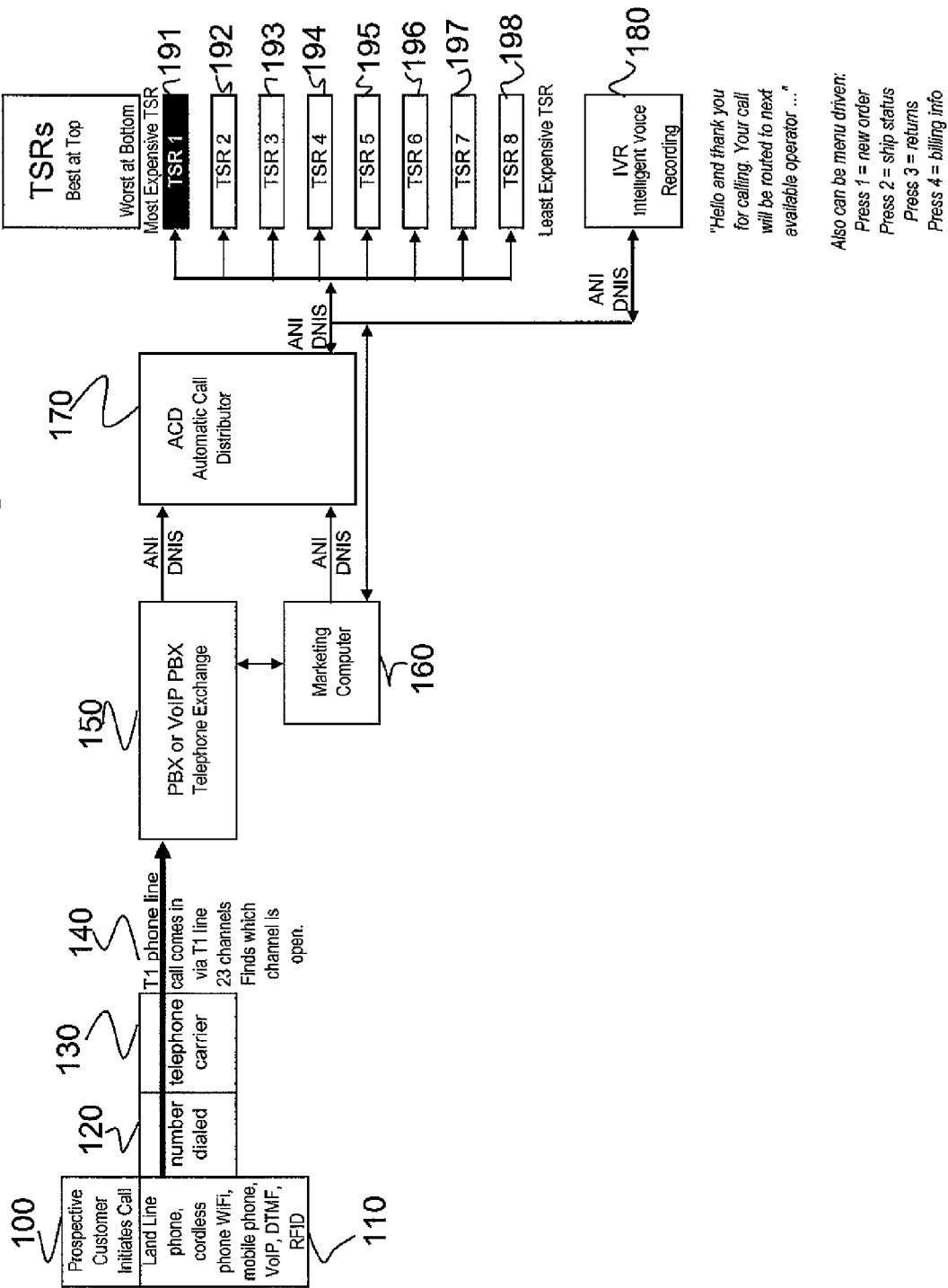
FIG. 1 is a block diagram showing telephone call path.

FIG. 1 shows the Call Path where a prospective customer 100 places a call on 110 which can be a traditional land line telephone, mobile phone, voice over internet protocol (VoIP), dual-tone multi-frequency (DTMF), or radio-frequency identification (RFID). Phone number dialed is 120. Phone call is transmitted via carrier 130. Phone call is received at 140, a T1, DS1, or E1 circuit. PBX 150 is the point of exchange from the public switched telephone network (PSTN) to the telemarketer. A Hosted PBX service provider is typically provided by the telephone company. No exchange is needed for VoIP calls, as PBX is incorporated in the VoIP technology. DNIS (Dialed Number Identification Service) identifies phone number dialed. The marketing computer 160 is the central hub for telemarketer. The ACD (Automatic Call Distributor) 170 routes this call to the best Telemarketing Sales Representative (TSR) available 191 thru 198 based on historical skills based table information as well as TSR availability. TSRs 191 to 198 may be located anywhere in the world and employed by different contractors or be independent contractors. The ACD may also send this call to Intelligent Voice Recording (IVR) 180 for the entire call or for a portion of the call such as an introduction, and then call is routed to TSR 191 thru 198. Or, the ACD 170 may send this call directly to a TSR, based on DINS protocol. Out of all the potential TSRs, this call reaches the most expensive TSR 191. TSR's 191 through 198 all use the same telemarketing script for each individual source code. Telemarketing script is defined as the primary offer(s) words and/or the selling price, secondary offer(s) words and/or selling price, and/or third party offerings. Telemarketing script may also be a coupon, or a survey, or an offer of entertainment content.

Figure 2:
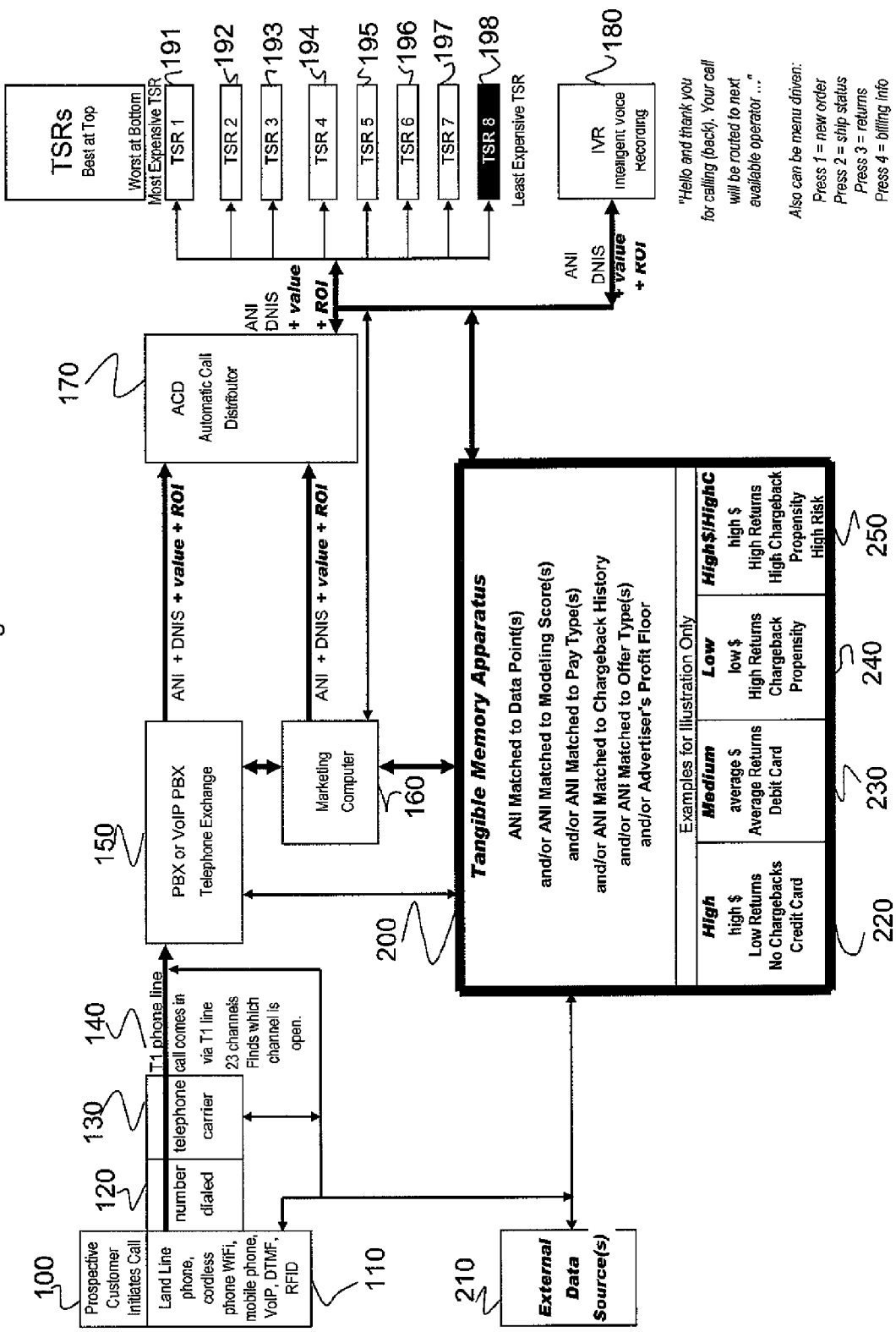
FIG. 2 is a block diagram which illustrates Caller Value to impact downstream actions.

FIG. 2 illustrates introducing Caller Value to impact downstream actions. Prospective customer 100 places a call on 110 land line telephone to phone number dialed 120, which is transmitted over telephone carrier 130 and received at T1 phone line 140 and exchanged to telemarketer at 150. At the earliest possible point in these connections, the ANI for this phone call is used as the key data point to access modeling score(s) from Tangible Memory Apparatus 200. Tangible Memory Apparatus 200 may utilize internal historical information related to this ANI and/or may pull in additional data from external data sources 210. The marketing computer 160 is the central telemarketing hub. Tangible Memory Apparatus 200 identifies modeling score(s) of prospective customer(s) value including High 220, Medium 230, Low 240 or High Revenue Value but High Chargeback Risk (High$/HighC) 250 propensity to purchase advertised product. Tangible Memory Apparatus 200 may also rank prospective customer(s) value to Advertiser's Profit Floor. This 250 call example is identified as High Revenue Value but High Risk for Chargeback (High$/HighC) and the ACD delays sending call in order to accelerate sending higher value callers to the most qualified TSRs. After giving priority to higher value prospective customers, this call example is sent to TSR 198, the least expensive live agent TSR, with a simplified offer and telemarketing script with no continuity offers to mitigate any confusion which may result from complex terms and conditions, and/or from a high quantity of upsells.

In addition to initially filtering the incoming call as just described, the Tangible Memory Apparatus 200 continues with two way communications as long as the caller remains on the line. Information supplied during the call is apt to change future screens and offers and telemarketing scripts appearing on the TSR's computer for remainder of the conversation. As with initial filtering, succeeding revisions occur quickly, and are not apparent to callers, and present timely updated instructions to TSRs or IVR.

For even greater Advertiser protection, the call 250, projected to be a high chargeback risk, can be either rejected with a "forced busy" signal and/or increase the hold time reaching the TSR agent and/or influence the selection of the TSR agent 191-198 or IVR 180 and/or the product and/or services offered and/or scripts, to provide chargeback protection to the Advertiser's business.

Figure 3:
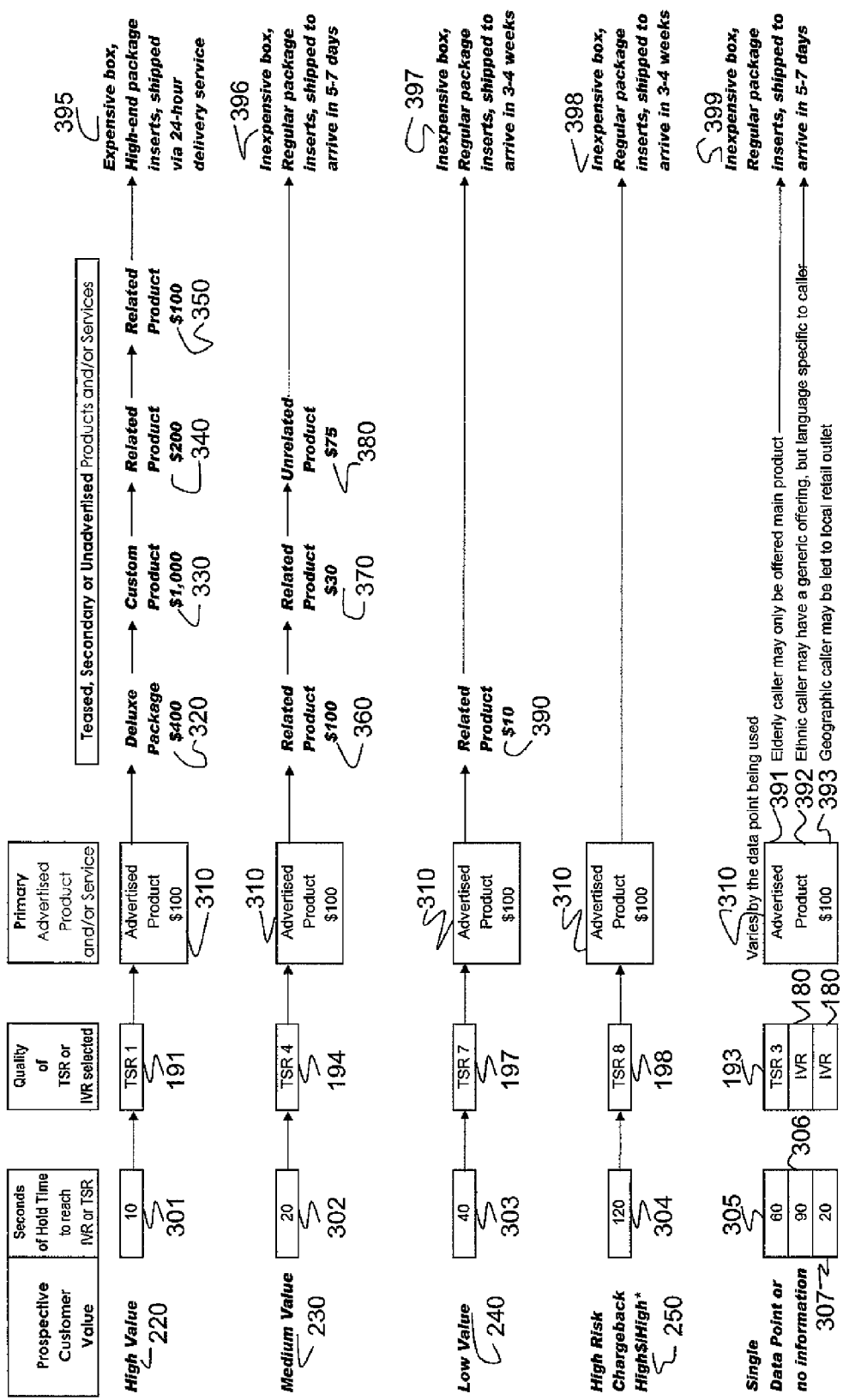
FIG. 3 is a block diagram showing examples of how Caller Value impacts decisions on hold time.

FIG. 3 shows examples of how Caller Value impacts decisions on hold time prior to reaching TSR and/or IVR, and the quality of TSR and/or IVR, and then drives the quantity of offers and price points of products and/or services offered. High Value Prospective Customer 220 holds for only 10 seconds 301 before reaching highly qualified and expensive TSR 191 who offers the main product 310 which was advertised, then offers $400 Deluxe Package 320, moving on to Custom $1,000 Product 330, and Related $200 Product 340, and lastly Related Product $100 350. After securing the completed order for High Value Prospective Customer 220, all selected offers that require package delivery are shipped in expensive box via 24-hour shipping 395.

The Medium Value Prospective Customer 230 in FIG. 3 is on hold for 20 seconds 302 before reaching medium qualified TSR 194 who offers the main product 310 which was advertised, then offers $100 Related Product 360, and $30 Related Product 370 and lastly $75 Unrelated Product 380. After securing the completed order from Medium Value Prospective Customer 230, all selected offers that require package delivery are shipped in an inexpensive box to arrive in 5 to 7 business days 396.

The Low Value Prospective Customer 240 in FIG. 3 is on hold for 40 seconds 303 before reaching low qualified and inexpensive TSR 197 who offers the main product 310 which was advertised, then offers $10 Related Product 390. After securing the completed order from Low Value Prospective Customer 240, this offer requires package delivery and is shipped in an inexpensive box filled with advertising package inserts and is shipped to arrive in 3-4 weeks 397.

High Risk Chargeback Prospective Customer with potential for High Revenue but also High Chargeback Risk (High$/HighC) 250 is on hold for 120 seconds 304 before reaching low qualified and least expensive TSR 198 who offers the main product 310 which was advertised. After securing the completed order from High Risk Chargeback Prospective Customer 250, this offer is shipped in an inexpensive box with package inserts and is shipped to arrive in 3-4 weeks 398.

Single Data Point Prospective Customer 391 is an elderly caller who holds for 60 seconds 305 before reaching highly qualified TSR 193 who offers the main product 310 which was advertised. After securing this completed order from elderly caller, selected offer is shipped in an inexpensive box to arrive in 5 to 7 business days 399.

Single Data Point Prospective Customer 392 is an ethnic caller who holds for 90 seconds 306 before reaching IVR 180 which offers the main product 310 in caller's language 392 which was advertised. After securing this completed order from ethnic caller, selected offer is shipped in an inexpensive box to arrive in 5 to 7 business days 399.

Single Data Point Prospective Customer 393 is identified as calling from a geographic region close to retail outlet. Geographic caller holds for 20 seconds 307 before reaching IVR 180 which gives a recording of directions to the local retail store 393.

Figure 4:
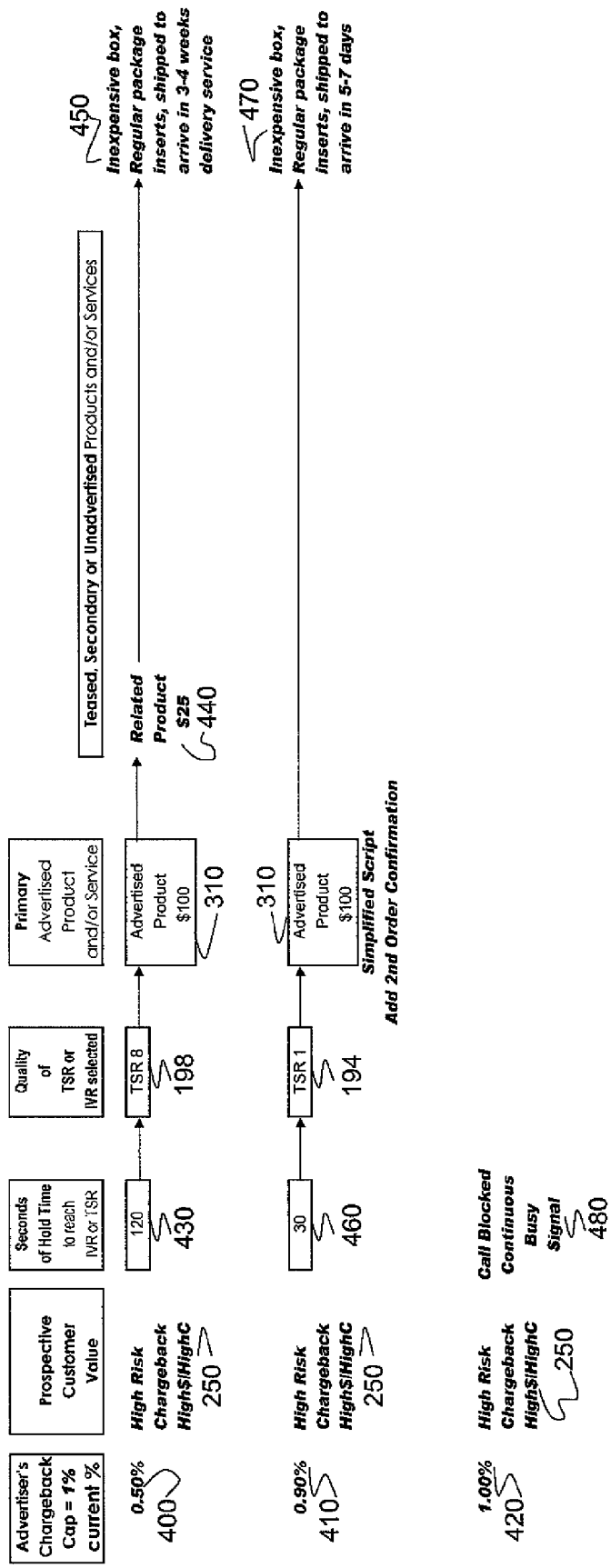
FIG. 4 is a block diagram illustrating revenue compared to risk.

FIG. 4 illustrates the balance between the desires for revenue from a High Risk Prospective Customer compared to the risk an Advertiser is willing to take as the Advertiser narrows the gap to the limit of their Merchant Bank's Chargeback Cap.

This advertiser 400 has a 0.5% rate of chargebacks, when his cap from his Merchant Bank is 1.0%, so he is well under his chargeback cap. So, when this advertiser receives the call from High Risk Chargeback Prospective Customer 250 High$/HighC, this advertiser desires the revenue from this caller and is willing to take the risk that this transaction may result in a future chargeback. High Risk Chargeback Prospective Customer 250 holds for 120 seconds 430 before reaching low qualified TSR 198 who offers the main product 310 which was advertised, then offers $25 Related Product 440. After securing the completed order for High Risk Chargeback Prospective Customer 250, all selected offers are shipped in inexpensive box to arrive in 3-4 weeks 450.

This advertiser 410 has a 0.9% rate of chargebacks, when his cap from his Merchant Bank is 1.0%, so he is very close to his chargeback cap. So, when this advertiser receives the call from High Risk Chargeback Prospective Customer 250 High$/HighC, this advertiser desires the revenue from this caller but needs to limit his risk that this transaction may result in a future chargeback. High Risk Chargeback Prospective Customer 250 holds for 30 seconds before reaching highly qualified TSR 194 who offers the main product 310 which was advertised but the telemarketing script is modified to be simpler and even clarifies the terms of the sale a second time for a second order confirmation. No additional offerings are made. After securing the completed order for High Risk Chargeback Prospective Customer 250, all selected offers are shipped in inexpensive box to arrive in 5-7 days 470. This advertiser limits the hold time, selects a very experienced TSR, offers the main product only with a second order confirmation and ships quickly in order to keep this customer happy and mitigate potential confusion with this order.

This advertiser 420 has a 1.0% rate of chargebacks, when his cap from his Merchant Bank is 1.0%, so he is at his chargeback limit. So, when this advertiser receives the call from High Risk Chargeback Prospective Customer 250 High$/HighC, this advertiser is not willing to risk taking the revenue from this caller because his Merchant Bank may increase his credit card transaction fees or even close his Merchant Bank account. Therefore, this advertiser elects to not to accept this phone call and it is blocked with a continuous busy signal 480. There is no shipment because there is no order.

At the moment advertising is broadcast with an 800# and/or a url, it is possible to have multiple responses in a very short window of time. It is therefore desirable to balance response by Prospective Customer Projected Value from modeling score(s) such as High, Medium, Low, and High Risk with TSR Quality and with appropriate advertised and non-advertised product and/or service offerings.

An Advertiser is interested in generating the greatest revenue at the least risk. The telemarketer is interested in generating maximum profit while still satisfying his Advertising client. Another example of the usefulness of this acute marketing knowledge at the beginning of the contact is the opportunity to Reverse Engineer the service of telemarketing by guaranteeing the Advertiser a return on investment (ROI) for Advertiser's media expense. Currently, the Advertiser purchases media with the hope of an acceptable ROI but there is no guarantee. In the following example, the telemarketer could choose to bear the risk of revenue generation by guaranteeing Advertiser will meet his ROI goal for an airing of media in exchange for higher compensation to the telemarketer. The telemarketer is empowered to deliver the revenue required because the telemarketer can balance the knowledge of the quality of the Prospective Customer with the need for revenue generation.

Figure 5:
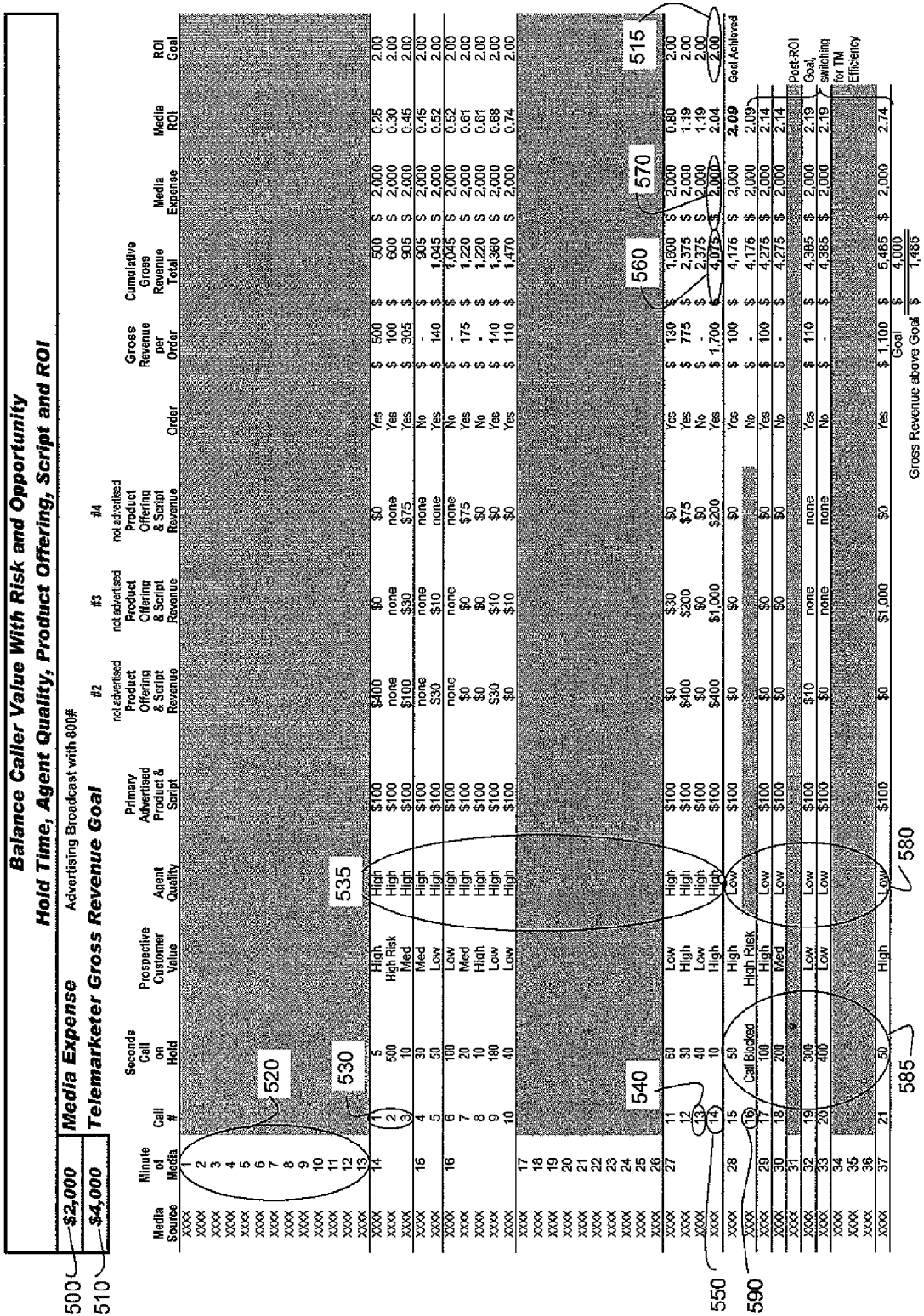
FIG. 5 is a block diagram illustrating incoming calls during the airing of a thirty minute infomercial.

As illustrated in FIG. 5, the airing of a 30 minute infomercial creates incoming calls or responses at various points in the infomercial, usually associated with the display on television of the 800# and/or url. For the first 13 minutes of media airing of this infomercial no responses have been received 520, media minutes 1-13. Once the 800# and/or url are displayed at minute 14 of the infomercial, responses 530 start to come in. FIG. 5 illustrates responses from phone calls but it is assumed that responses will also be coming to the website advertised. Three calls 530 are received at minute 14. There is often a cluster of Prospective Customers calling within a short period of time. As described earlier, this invention prioritizes the Prospective Customers based on their modeling score(s) of projected value. The telemarketer and advertiser have previously agreed that the telemarketer will deliver $4,000 of gross revenue 510 for this $2,000 media expense 500, for an Advertiser's ROI goal of 2.00 515. In exchange, Advertiser will pay telemarketer at a higher rate per minute for the entire media airing than is the norm.

The telemarketer wishes to reach this 2.00 ROI goal at the earliest possible moment, so telemarketer uses his highest quality TSRs 535 until ROI goal is realized. As of call 13 540, the telemarketer has not met his obligation. When call 14 550 is received from High Value Prospective Customer, the TSR delivers the offering and customized script for the main product, and then continues to sell high dollar upsells until he reaches the revenue needed for 2:1 goal.

So this telemarketer successfully reaches his ROI goal 515 for Advertiser with Prospective Customer call 14 received at the 27 minute mark of media. Now the telemarketer has generated $4,075 in gross revenue 560 for the advertiser to offset Advertiser's $2,000 media expense 570 for this media airing. Thus the telemarketer has reached his 2:1 goal. Advertiser continues to pay Telemarketer at the higher agreed upon rate, so any calls this Telemarketer handles after call 14 is incremental Advertiser revenue. Now the telemarketer wishes to ran his telemarketing center with a focus toward telemarketer's profit, so telemarketer directs calls to Low quality TSRs quickly after call 14. Lower quality TSRs 580 used on calls 15-21 are less expensive for telemarketer. Wait time 585 for Prospective Customers during minutes 29-37 are generally longer since this telemarketer is prioritizing his highest quality TSRs for other business. Call 16, 590 is received from High Risk Chargeback caller and is blocked because revenue goal has been already reached, therefore reducing the desire to risk a chargeback.

Figure 6:
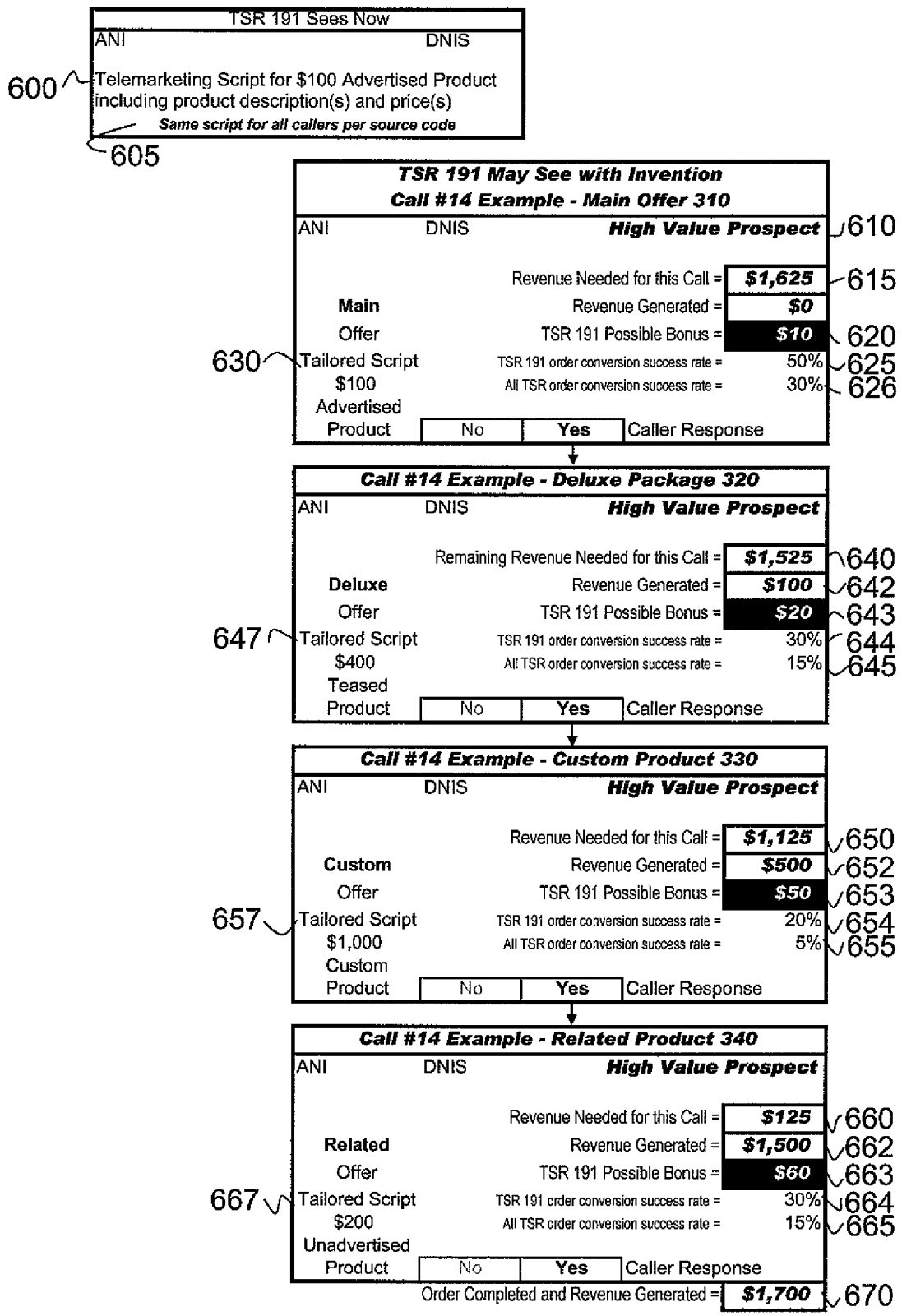
FIG. 6 is a block diagram illustrating how information is used to improve conversion rate; and, FIGS. 7.1, 7.2, 7.3, and 7.4 describe the various data points that can be used in developing modeling scores to define prospective customer value and/or to influence hold time, and/or TSR selection, and/or offers, and/or scripts, and/or price, and/or information displayed for the TSR.

FIG. 6 shows how information may be used with the TSR in order to improve TSR conversion rate performance. Taking our Caller 14 550 from FIG. 5 as an example, TSR 191 in FIG. 6 600 would see the same telemarketing script and price point as for all callers to this particular source code. But with this invention, TSR 191 may see prospective customer value 610. TSR may see the Revenue needed for this Call as $1,625 615 as well as a $10 Bonus if he closes this sale 620. He may also see his historic conversion success as 50% 625, when his peers' success rate is only 30% 626. The telemarketing script used for this main product is customized to the characteristics of this caller 630. Rather than seeing the same script over and over again as in the past, the TSR can now see the individual opportunity with each new call. Caller Value may be indicated with words such as High, Medium and Low and/or with a numerical score and/or color coding. Caller Risk may be shown as Chargeback Risk and/or Return Risk so that the telemarketer may use extra care to keep everything simple and easy to understand. And TSR success metrics 625 may also be shown to stimulate TSR success.

Now that the main product order has been accepted by this high value caller, we move to the second offering where the TSR sees $1,525 Remaining Revenue Needed 640 and $100 Revenue already generated on this order 642 and the TSR bonus has grown to $20 643 with TSR success rate for this upsell at 30% 644 compared to his peers at 15% 645, with a telemarketing script customized to this high value prospect 647.

This deluxe upsell offer has been accepted by this high value caller, and we move to the third offering where the TSR sees $1,125 Remaining Revenue Needed 650 and $500 Revenue already generated on this order 652 and the TSR bonus has now grown to $50 653 with TSR success rate for this upsell at 20% 654 compared to his peers at 5% 655 with a telemarketing script customized to this high value prospect 657.

This custom upsell offer has been accepted by this high value caller, and we move to the fourth offering where the TSR sees only $125 Remaining Revenue Needed 660 and $1,500 Revenue already generated on this order 662 and the TSR bonus has now grown to $60 663 with TSR success rate for this upsell at 30% 664 compared to his peers at 15% 665 with a telemarketing script customized to this high value prospect 667. Now that this TSR secures this upsell and the revenue goal has been achieved, the TSR closes this $1,700 order 670. TSR has earned a $60 bonus 663 and the telemarketer has met his ROI goals 560 on FIG. 5.

FIGS. 7.1, 7.2, 7.3 and 7.4 describe the various data points that can be used in developing modeling score(s) for prospective customer(s) Value and information that may influence hold time, TSR selection, TSR information display, IVR selection, product(s) and/or service(s) offered, offer type(s), script selection(s), selling price(s) offered, plus factors such as Advertiser's ROI, and/or Telemarketer's ROI.

There is great value here to utilize prospective customer(s) Value to help enhance the telemarketing experience for the Prospective Customer, mitigate risk for the Advertiser, secure Advertiser ROI, as well as to enhance telemarketing agent performance and Telemarketer ROI.

Having thus described the invention, I claim:

1. A method for direct marketing of a primary offering with a prospective customer comprising:
   (a) establishing a first communications link between a prospective customer using a device having a unique identification number and an advertiser or service provider's communications device:
   (b) automatically transmitting the unique identification number associated with the prospective customer's device to the advertiser or service provider's communications device;
   (c) establishing a second communications link between the advertiser or service provider's communications device and an advertiser or service provider's computer operably connected to a tangible memory apparatus having a prospective customer database comprising prospective customer information associated with the unique identification number of the prospective customer's device;
   (d) the advertiser or service provider's computer pulling in or developing the value and risk of the prospective customer based upon the prospective customer information in the tangible memory apparatus;
   (e) preparing a plurality of scripts for each product and service for communication with the prospective customer, said plurality of scripts being divided into groups based upon the prospective customer's value and risk;

(f) the value and risk of the prospective customer determining the selection of which script is selected by the advertiser or service provider's computer for communication with the prospective customer, prior to any communication with a sales representative;
(g) and an increase or decrease in the service provider's incentive is based upon prospective customer value and risk;
(h) in which the incentive is applied to a single upsell or the entire order.

2. The method of direct marketing of claim 1 in which the incentive can increase or decrease based on the status of the return on investment.

3. The method of direct marketing of claim 1 in which the incentive can increase or decrease based on the service provider's prior success rate with the prospective customer value and risk for order, for upsell or both.

* * * * *